G. McNEILL.
TIRE BEAD CUTTING APPARATUS.
APPLICATION FILED AUG. 10, 1916.

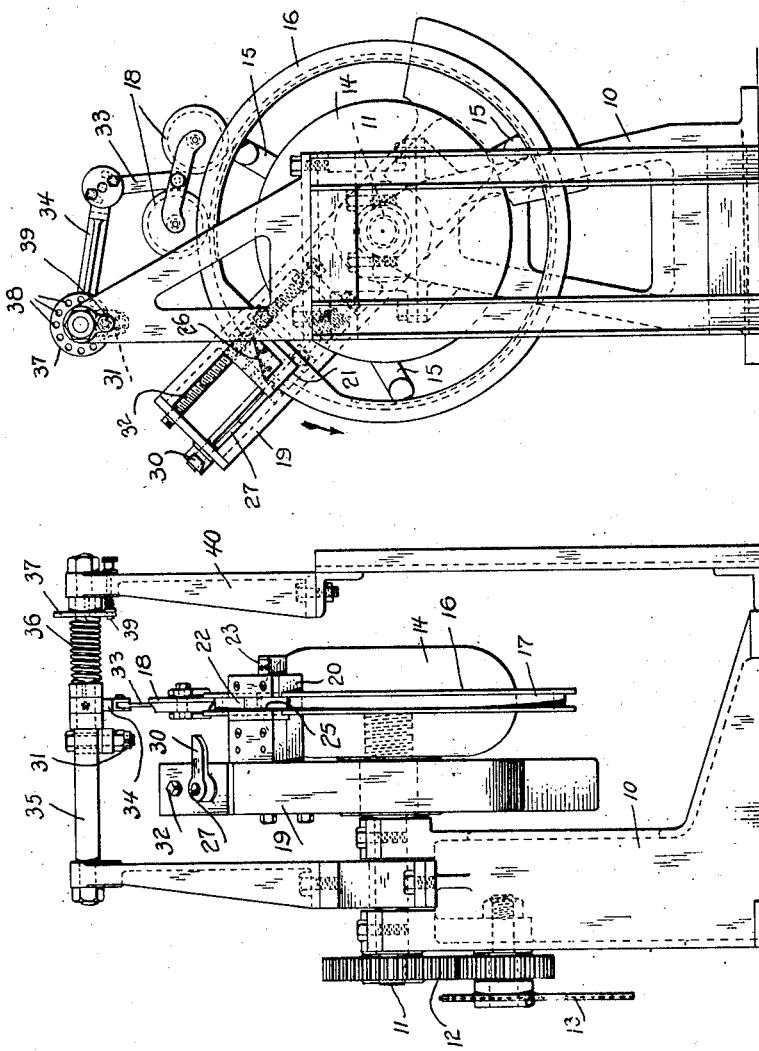

1,332,990.

Patented Mar. 9, 1920.
2 SHEETS—SHEET 2.

WITNESS:
S. G. Taylor.

INVENTOR
George McNeill,
BY
Ernest Hopkinson
HIS ATTORNEY

UNITED STATES PATENT OFFICE.

GEORGE McNEILL, OF DETROIT, MICHIGAN, ASSIGNOR TO MORGAN & WRIGHT, A CORPORATION OF MICHIGAN.

TIRE-BEAD-CUTTING APPARATUS.

1,332,990.   Specification of Letters Patent.   Patented Mar. 9, 1920.

Application filed August 10, 1916. Serial No. 114,151.

*To all whom it may concern:*

Be it known that I, GEORGE MCNEILL, a citizen of the United States, residing in Detroit, county of Wayne, and State of Michigan, have invented certain new and useful Improvements in Tire-Bead-Cutting Apparatus, of which the following is a full, clear, and exact description.

This invention relates to tire bead cutting apparatus. In the manufacture of tires it is customary to employ beads which are formed of hard rubber composition and serve to stiffen the tire at the edges. Usually the bead is made in the form of a ribbon of triangular cross-section which after being suitably treated must be cut into lengths equal to the circumference of the tire at the edge. The apparatus of the present invention is designed to cut a bead into such lengths in a continuous operation.

The invention can be readily understood from the following description taken in connection with the accompanying drawing, in which—

Figure 1 is a front elevation of the apparatus.

Fig. 2 is a side elevation of the apparatus.

Figure 3:
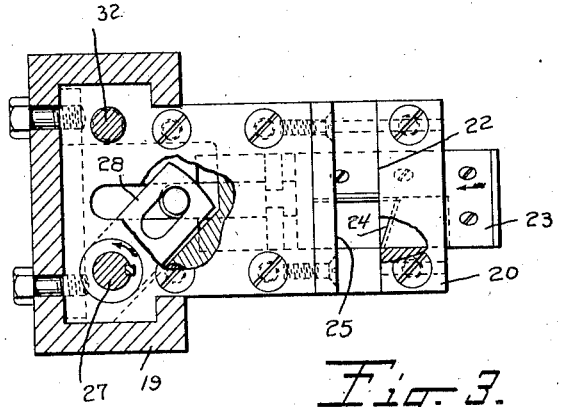
Fig. 3 is a detail sectional view showing the knife carrier.
Figure 4:
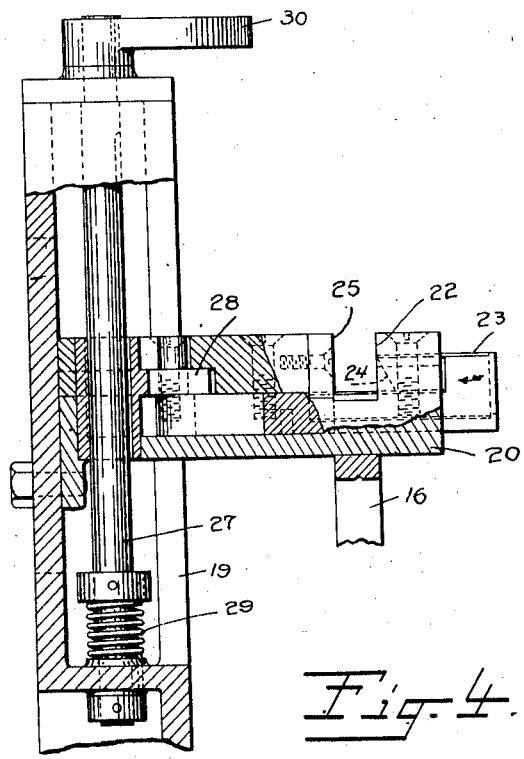
Fig. 4 is a detail side view, partly in section, of the parts shown in Fig. 3.

Referring now to the drawing, in which like characters of reference designate similar parts, 10 designates a standard upon which is revolubly mounted a shaft 11 which is power turned by a gear train 12 and a chain drive 13, or otherwise. The shaft is terminally equipped with a hub 14 having spokes 15 which removably secure an annulus 16 to the hub. The annulus is provided with a peripheral guide groove 17 for the reception of the bead. The bead is pressed frictionally against the annulus by presser rollers 18, consequently, during rotation, the annulus feeds the bead continuously from the bead supply. During each cycle made by the annulus, a length of the bead equal to the circumference of the annulus is fed progressively underneath the rollers 18. The length of bead thus measured off by the annulus is severed from the supply and for this purpose the following mechanism is employed.

A frame 19 is secured to the shaft 11 and rotates as a unit with the annulus. The frame is equipped with an arm 20 which is received in a recess 21 formed in the annulus. The arm is provided with a groove 22 which forms a continuation of the groove in the annulus and receives the bead at a point directly underneath the presser rollers 18. The knife 23 is mounted to slide longitudinally of the arm and across the groove 22, the knife being hook shape as best shown in Fig. 3 and having its cutting edge 24 presented to one side of the bead. The side wall 25 of the groove forms an abutment for the bead opposite the knife edge during the cutting operation, the bead being pressed firmly against this abutment by the presser rollers which are of such marginal contour as to conform to the triangular shape of the bead, as best shown in Fig. 1. The knife is fitted in a guide-way 26 which positions the knife obliquely with respect to the axis of the bead so that a shearing cut is made to provide a lap joint when the edges of the severed piece are brought together in building the bead into a tire.

For actuating the knife, a rock shaft 27 is journaled in suitable bearings in the frame 19 and is provided with a crank 28 which is pivotally connected to the knife as shown in Fig. 3. The shaft is normally held in released position by a helical spring 29 and is equipped with an operating lever 30 by means of which the shaft may be rocked against the tension of the spring to actuate the knife. A stationary stud 31 projects into the path of the lever near the point of discharge of the bead from between the annulus and presser rollers and as the frame 19 passes the stud during each cycle made by the annulus, the stud positively moves the lever to rock the shaft 27 whereby the knife is drawn across the groove toward the abutment and severs the measured length of bead from the supply.

Various sizes of tires require corresponding lengths of beads, consequently I provide a plurality of annuli similar to the annulus 16 but having circumferences corresponding to the circumferences of the edges of the tires for which beads are to be cut. These annuli are interchangeably received upon the spokes 15 which are adapted to be extended outwardly from the hub 14 or to be withdrawn toward the hub for this purpose, by suitable mechanism, not shown. To accommodate these various annuli, the knife carrying arm 20 is adjustable radially on the frame 19 by means of a screw 32.

To adjust the rollers 18 so that the pressure thereof may be maintained uniform upon the various annuli, the rollers are mounted upon an arm 33 which is adjustably secured to an arm 34 carried upon a bracket 35 to which the before mentioned stud 31 is secured. The helical spring 36 which supplies pressure to the rollers is secured to the arm 34 and to a regulator disk 37 having a plurality of orifices 38 which interchangeably receive a spring pressed pin 39 carried by a standard 40. The tension of the spring 36 and consequently the pressure of the rollers 18, may be increased or diminished by rotating the disk and inserting the pin 39 in the particular opening in the disk which will hold the spring under the desired tension.

In operation, the end of the bead is placed upon the annulus 16 underneath the rollers 18 and disposed in register with the knife. The machine is now started, whereupon the bead will be fed continuously from the supply by the annulus. The knife operating lever 30 will eventually contact with and be turned by the stud 31 and actuate the knife to sever the bead, this taking place at the end of each cycle, so that lengths of the bead measured off by the annulus, and corresponding in length to the circumference of the annulus, will be severed from the supply continuously.

Having thus described my invention, what I claim as new and desire to protect by Letters Patent is:

1. A bead cutting apparatus comprising an annulus for supporting a bead, means for detachably supporting and rotating the annulus to advance the bead, whereby annuli of various diameters may be interchangeably used, and cutting means automatically movable into and out of active position during a rotation of the annulus for severing the bead after a predetermined length of the latter has been advanced.

2. A bead cutting apparatus comprising an annulus for supporting a bead, means for supporting and rotating the annulus to advance the bead, cutting means acting automatically to sever the bead upon the annulus after a predetermined length of the bead has been advanced, and means for adjusting the said cutting means for interchangeable annuli of various diameters.

3. A bead cutting apparatus comprising an annulus for supporting a bead, a supporting member adapted for annuli of various diameters and rotating means therefor, means for clamping the bead upon the annulus, cutting means acting automatically to sever the bead after a predetermined length of the latter has been advanced upon the annulus, means for adjusting the active position of the clamping means, and means for similarly adjusting the cutting means.

4. A bead cutting apparatus comprising an annulus, a rotary support adapted for annuli of various diameters, a frame mounted to rotate simultaneously with the said support, a knife adjustable relatively to the axis of the said frame, and means for automatically operating said knife to sever the bead after a predetermined length of the latter has been advanced upon the annulus.

5. A bead cutting apparatus comprising feeding means for advancing a bead progressively, a cutter for severing the bead, guiding means for said cutter, automatically acting operating means for the cutter, and means for adjusting the position of the cutter and its guiding means relatively to its operating means.

6. A bead cutting apparatus comprising an annulus for supporting a bead, a rotary support for the annulus adapted for annuli of various diameters, a spring pressed clamping member for pressing the bead against the annulus, and means for adjusting the spring pressure upon the said clamping member to compensate for changes in the diameter of the annulus upon said support.

7. A bead cutting apparatus, comprising an annulus for supporting a bead, means for pressing the bead against the annulus, means for rotating the annulus to advance the bead progressively, a frame rotatable as a unit with the annulus, an arm on the frame having a groove for receiving the bead from the annulus, a knife on the arm movable across the groove to sever the bead, means for actuating the knife, and means for adjusting the arm on the frame radially with respect to the annulus whereby annuli of various diameters may be interchanged with said annulus.

8. A bead cutting apparatus, comprising an annulus for supporting a bead, a presser member for forcing the bead against the annulus, means for rotating the annulus to advance the bead progressively, a knife support adjustable independently of and rotatable as a unit with the annulus, a knife on the support movable across the annulus to sever the bead, means adapted to reciprocate the knife, an actuating lever for said means, and a contact device projecting into the path of said lever near the point of discharge of the bead from between the annulus and presser member and serving to move the lever to actuate the knife near said point of discharge.

9. A bead cutting apparatus comprising a support for detachably carrying an annulus and a cutter support mounted to rotate in unison with said first support, a cutter mounted on said second support and adjustable in a direction radial of said annulus, means coacting with said annulus to feed a tire bead, and automatic means for actuating said cutter to sever the tire bead.

10. A bead cutting apparatus comprising a rotatable annulus, means mounted independently thereof and coacting therewith to feed a tire bead, a bead cutter mounted independently of said annulus but rotatable therewith, and means actuating said cutter at predetermined intervals.

11. A bead cutting apparatus comprising a rotatable annulus, means coacting therewith to feed a tire bead, a cutter mounted independently of said annulus but rotatable therewith, and means for moving said cutter across the annulus at predetermined intervals.

12. A bead cutting apparatus comprising a rotatable grooved annulus, means disposed outside of said annulus and coacting with its groove to feed a tire bead, and means for severing the bead at predetermined intervals.

13. In a device for cutting material into lengths, interchangeable feed means for feeding predetermined different lengths, and a periodically operable cutter for the material movable simultaneously therewith and adjustable in accordance with the feed means employed.

Signed at Detroit, Mich., this 28th day of July, 1916.

GEORGE McNEILL.